US011830288B2

(12) United States Patent
Yao et al.

(10) Patent No.: US 11,830,288 B2
(45) Date of Patent: Nov. 28, 2023

(54) METHOD AND APPARATUS FOR TRAINING FACE FUSION MODEL AND ELECTRONIC DEVICE

(71) Applicant: BEIJING BAIDU NETCOM SCIENCE AND TECHNOLOGY CO., LTD., Beijing (CN)

(72) Inventors: Kun Yao, Beijing (CN); Zhibin Hong, Beijing (CN); Jieting Xue, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 388 days.

(21) Appl. No.: 17/210,827

(22) Filed: Mar. 24, 2021

(65) Prior Publication Data
US 2021/0209423 A1    Jul. 8, 2021

(30) Foreign Application Priority Data
Apr. 17, 2020    (CN) .......................... 202010307679.4

(51) Int. Cl.
*G06F 18/214*    (2023.01)
*G06F 18/21*    (2023.01)
(Continued)

(52) U.S. Cl.
CPC ........ *G06V 40/169* (2022.01); *G06F 18/2148* (2023.01); *G06F 18/2185* (2023.01);
(Continued)

(58) Field of Classification Search
None
See application file for complete search history.

(56) References Cited

U.S. PATENT DOCUMENTS 11,325,313 B2\*   5/2022  Manousakis ........... B33Y 50/02
2019/0251401 A1\*  8/2019  Shechtman ............ G06V 10/82
(Continued)

FOREIGN PATENT DOCUMENTS

CN    108021905 A    5/2018
CN    108510437 A    9/2018
(Continued)

OTHER PUBLICATIONS

Zhan et al., Spatial Fusion GAN for Image Synthesis, IEEE/CVF Conference on Computer Vision and Pattern Recognition (Year: 2019).\*

(Continued)

*Primary Examiner* — Mohammed Rachedine
(74) *Attorney, Agent, or Firm* — Lippes Mathias LLP

(57) ABSTRACT

Embodiments of the present disclosure provide a method for training a face fusion model and an electronic device. The method includes: performing a first face changing process on a user image and a template image to generate a reference template image; adjusting poses of facial features of the template image based on the reference template image to generate a first input image; performing a second face changing process on the template image to generate a second input image; inputting the first input image and the second input image into a generator of an initial face fusion model to generate a fused face area image; and inputting the fused image and the template image into a discriminator of the initial face fusion model to obtain a result, and performing backpropagation correction on the initial face fusion model based on the result to generate a face fusion model.

20 Claims, 6 Drawing Sheets

(51) Int. Cl.
*G06F 18/24* (2023.01)
*G06F 18/2413* (2023.01)
*G06F 18/25* (2023.01)
*G06V 40/16* (2022.01)
*G06N 3/047* (2023.01)
*G06N 20/00* (2019.01)
*G06T 5/50* (2006.01)
*G06T 7/73* (2017.01)
*G06V 10/764* (2022.01)
*G06V 10/774* (2022.01)
*G06V 10/80* (2022.01)
*G06V 10/82* (2022.01)
*G06N 3/088* (2023.01)
*G06N 3/045* (2023.01)

(52) U.S. Cl.
CPC .......... *G06F 18/24765* (2023.01); *G06T 7/74* (2017.01); *G06V 10/764* (2022.01); *G06V 10/774* (2022.01); *G06V 10/80* (2022.01); *G06V 10/82* (2022.01); *G06V 40/168* (2022.01); *G06N 3/045* (2023.01); *G06N 3/088* (2013.01); *G06T 2207/20084* (2013.01); *G06T 2207/30201* (2013.01)

(56) References Cited

U.S. PATENT DOCUMENTS

| | | | |
|---|---|---|---|
| 2021/0124976 A1* | 4/2021 | Kim | G06V 10/82 |
| 2021/0174109 A1* | 6/2021 | Beller | G06V 30/416 |

FOREIGN PATENT DOCUMENTS

| | | | | | |
|---|---|---|---|---|---|
| CN | 108665408 | A | | 10/2018 | |
| CN | 109978754 | A | | 7/2019 | |
| CN | 110163832 | A | | 8/2019 | |
| CN | 110399849 | A | | 11/2019 | |
| CN | 110443230 | A | | 11/2019 | |
| CN | 110503601 | A | | 11/2019 | |
| CN | 110532871 | A | | 12/2019 | |
| CN | 110889381 | A | | 3/2020 | |
| CN | 110956079 | A | | 4/2020 | |
| CN | 108615010 | B | * | 2/2022 | ......... G06K 9/00302 |
| CN | 109325549 | B | * | 3/2022 | ........... G06K 9/6288 |
| CN | 109099912 | B | * | 5/2022 | ........... G01C 21/165 |
| JP | 2020508522 | A | | 3/2020 | |
| WO | WO-2019120115 | A1 | * | 6/2019 | ......... G06K 9/00288 |

OTHER PUBLICATIONS

Office Action in CN202010307679.4, dated Jan. 4, 2023, 4 pages.
Extended Europan Search Report for Application No. 21164443.0, dated Sep. 27, 2021, 7 pages.
Fangneng Zhan et al., "Spatial Fusion GAN for Image Synthesis", Jun. 15, 2019 IEEE/CVF Conference on Computer Vision and Pattern Recognition (CVPR), 10 pages.
Office Action for Japanese Application No. 2021-051619, dated Mar. 22, 2022, 2 pages.
Bei Congzi et al., "The effect of the non-object removal in generation of a pose image", Information Processing Society of Japan, Nov. 7, 2019, 5 pages.
Donggyu Joo et al., "Generating a Fusion Image: One's Identity and Another's Shape", IEEE/CVF Conference on Computer Vision and Pattern Recognition, Jun. 18, 2018, 9 pages.

* cited by examiner

METHOD AND APPARATUS FOR TRAINING FACE FUSION MODEL AND ELECTRONIC DEVICE

CROSS REFERENCE TO RELATED APPLICATION

This application is based on and claims priority to Chinese Patent Application No. 202010307679.4, filed on Apr. 17, 2020, the entire content of which is hereby incorporated by reference.

TECHNICAL FIELD

The present disclosure relates to a field of image processing technologies, specifically a field of artificial intelligence technologies, and more particularly, to a method for training a face fusion model, an apparatus for training a face fusion model, and an electronic device.

BACKGROUND

Face fusion aims to seamlessly fuse a target face from a user image into a template image to obtain a fusion image, and the fusion image requires to maintain semantic rationality and boundary consistency of a face area.

SUMMARY

Embodiments of the present disclosure provide a method for training a face fusion model, an apparatus for training a face fusion model, an electronic device and a storage medium.

In a first aspect, the embodiments of the present disclosure provide a method for training a face fusion model. The method includes: performing a first face changing process on a user image and a template image to generate a reference template image; adjusting poses of facial features of the template image based on the reference template image to generate a first input image; performing a second face changing process on the template image to generate a second input image; inputting the first input image and the second input image into a generator of an initial face fusion model to generate a fused face area image; fusing the fused face area image with a background area image of the template image to generate a fused image; and inputting the fused image and the template image into a discriminator of the initial face fusion model to obtain a result, and performing backpropagation correction on the initial face fusion model based on the result to generate a face fusion model.

In a second aspect, the embodiments of the present disclosure provide a face fusion method, using a face fusion model generated according to the above embodiments. The face fusion method includes: obtaining a face fusion request comprising a target user image and a target template image; performing a first face changing process on the target user image and the target template image to generate a reference template image; adjusting poses of facial features of the target template image based on the reference template image to generate an input image; processing the input image and the reference template image by a generator of a face fusion model to generate a fused face area image; and fusing the fused face area image and a background area image of the target template image to generate a target fusion image.

In a third aspect, the embodiments of the present disclosure provide an electronic device. The device includes: at least one processor; and a memory connected in communi- cation with the at least one processor. The memory stores instructions executable by the at least one processor, when the instructions are executed by the at least one processor, the at least one processor are the configured to: perform a first face changing process on a user image and a template image to generate a reference template image; adjust poses of facial features of the template image based on the reference template image to generate a first input image; perform a second face changing process on the template image to generate a second input image; input the first input image and the second input image into a generator of an initial face fusion model to generate a fused face area image; fuse the fused face area image with a background area image of the template image to generate a fused image; and input the fused image and the template image into a discriminator of the initial face fusion model to obtain a result, and perform backpropagation correction on the initial face fusion model based on the result to generate a face fusion model.

In a fourth aspect, the embodiments of the present disclosure provide an electronic device, using a face fusion model generated according to the above embodiments. The device includes: at least one processor; and a memory connected in communication with the at least one processor. The memory stores instructions executable by the at least one processor, when the instructions are executed by the at least one processor, the at least one processor are the configured to: obtain a face fusion request comprising a target user image and a target template image; perform a first face changing process on the target user image and the target template image to generate a reference template image; adjust poses of facial features of the target template image based on the reference template image to generate an input image; process the input image and the reference template image by a generator of a face fusion model to generate a fused face area image; and fuse the fused face area image and a background area image of the target template image to generate a target fused image.

In a fifth aspect, the embodiments of the present disclosure provide a non-transitory computer-readable storage medium storing computer instructions, when the computer instructions are executed, the computer is caused to implement a method for training a face fusion model, and the method includes: performing a first face changing process on a user image and a template image to generate a reference template image; adjusting poses of facial features of the template image based on the reference template image to generate a first input image; performing a second face changing process on the template image to generate a second input image; inputting the first input image and the second input image into a generator of an initial face fusion model to generate a fused face area image; fusing the fused face area image with a background area image of the template image to generate a fused image; and inputting the fused image and the template image into a discriminator of the initial face fusion model to obtain a result, and performing backpropagation correction on the initial face fusion model based on the result to generate a face fusion model.

In a sixth aspect, the embodiments of the present disclosure provide storing computer instructions, wherein the computer instructions are used to cause the computer to implement a face fusion method, using a face fusion model generated according to the above embodiments, and the method includes: obtaining a face fusion request comprising a target user image and a target template image; performing a first face changing process on the target user image and the target template image to generate a reference template image; adjusting poses of facial features of the target template image based on the reference template image to generate an input image; processing the input image and the reference template image by a generator of a face fusion model to generate a fused face area image; and fusing the fused face area image and a background area image of the target template image to generate a target fused image.

It should be understood that the content described in this section is not intended to identify key or important features of the embodiments of the disclosure, nor is it intended to limit the scope of the application. Additional features of this disclosure are easily understood through the following description.

BRIEF DESCRIPTION OF THE DRAWINGS

The accompanying drawings are used to better understand the solution, and do not constitute a limitation on the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

The technical solution of the present disclosure provides a method for training a face fusion model to solve the technical problem in the related art that when a face area in a template image and a face area in a user image have differences in lighting conditions or individual skin color, it is easy to cause a difference in the skin color in the fused image.

A method for training a face fusion model, an apparatus for training a face fusion model, an electronic device, and a storage medium are described in detail with reference to the accompanying drawings.

Figure 1:
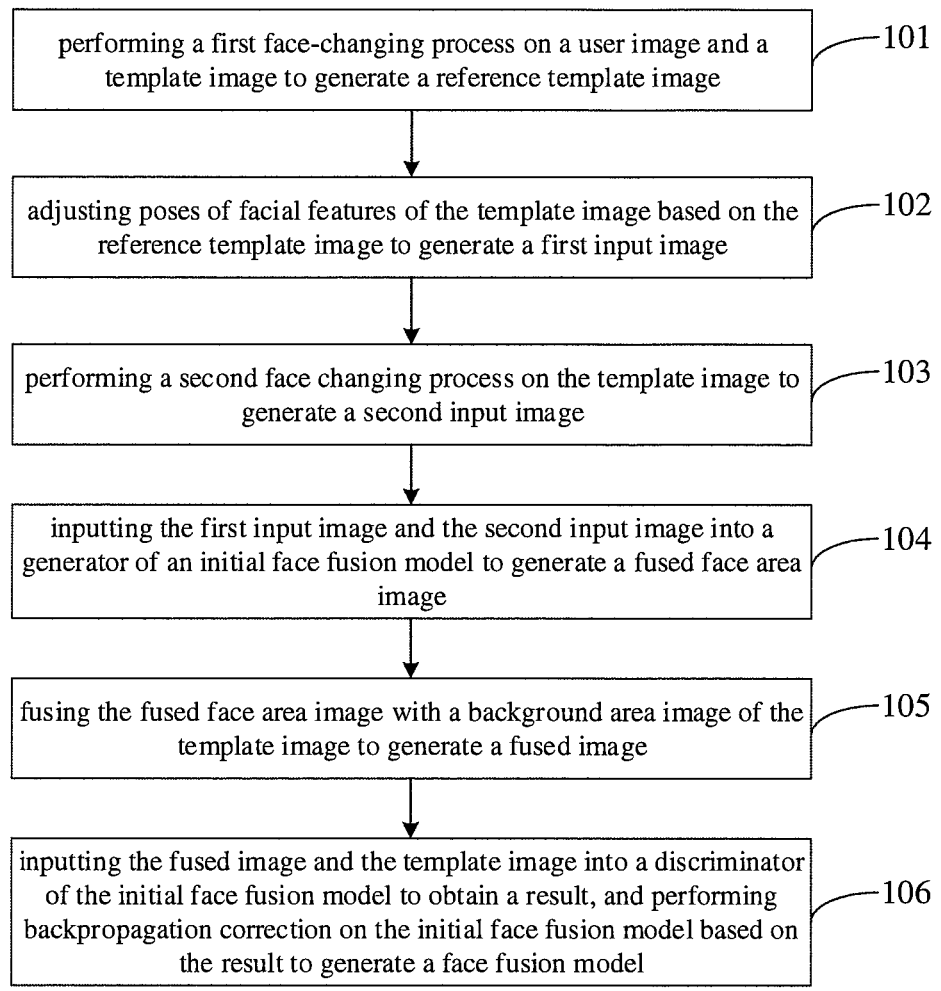
FIG. 1 is a flowchart of a method for training a face fusion model according to an embodiment of the disclosure.

FIG. 1 is a flowchart of a method for training a face fusion model according to an embodiment of the disclosure.

As illustrated in FIG. 1, the method for training the face fusion model includes the followings. At block 101, a first face changing process is performed on a user image and a template image to generate a reference template image.

It should be noted that the face fusion model according to the embodiment of the present disclosure may be implemented based on Generative Adversarial Networks (GAN).

The user image refers to a source image containing a target face. The template image refers to a bottom plate image used for fusing with the target face in the user image.

In the embodiments of the present disclosure, any face changing algorithm may be used to perform the first face changing process on the user image and the template image, such that the face area in the user image is fused into the face area in the template image, that is, the preliminarily face changing and face fusion are performed on the user image and the template image to generate the reference template image.

At block 102, poses of facial features of the template image are adjusted based on the reference template image to generate a first input image.

In the embodiment of this disclosure, since performing the first face changing process on the user image and the template image is that the facial features of a face area in the user image are used to replace the facial features of a face area in the template image, that is, the facial features of a face area in the reference template image are the facial features of the face area in the user image, so the facial features of the face area in the reference template image is used to adjust poses of the facial features of the template image to generate the first input image. That is, the first input image includes a background area, skin color information of the face area in the template image, and the facial features of the face area in the user image.

The facial features may be five sense organs in the face, such as, eyes, a nose, a mouth, ears, eyebrows.

At block 103, a second face changing process is performed on the template image to generate a second input image.

The second face changing process (or called a face self-changing process) refers to that the template image is respectively used as the bottom plate image and the source image containing the target face, and the second face changing process is performed on the template image.

It should be noted that when a face changing algorithm is used for the second face changing process, it is required to use the bottom plate image and the source image containing the target face as two input data of the face changing algorithm, such that the face changing algorithm generates the face changed image based on the bottom plate image and the source image.

In the embodiment of the present disclosure, the template image is used as the two input data of the face changing algorithm, such that the face changing algorithm replaces the facial features of the face area in the template image according to the facial features of the face area in the template image. That is, the face self-changing process is performed on the template image, and a result of the face self-changing process on the template image is used as the second input image.

It should be noted that since performing the second face changing process on the template image is that performing the second face changing process on the template image based on the facial features of the target image itself, so the skin color information in the second input image and the skin color information in the template image are consistent, and there is no difference in the skin color in the face area.

At block 104, the first input image and the second input image are input into a generator of an initial face fusion model to generate a fused face area image.

The initial face fusion model may be a GAN model. When the initial face fusion model is the GAN model, the initial face fusion model includes a generator and a discriminator.

In the embodiment of the present disclosure, the first input image and the second input image may be input to the generator of the initial face fusion model, such that the generator fuses the face area in the first input image with the face area in the second input image to generate the fused face area image. Since the first input image includes the facial features of the face area in the user image and the skin color information of the face area in the template image, and the second input image includes the facial features and the skin color information of the face area in the template image. Thus, the fused face area image not only may integrate the facial features of the face area in the user image, but also may use the second input image as supervision data, such that the skin color information of the fused face area image and the skin color information of the template image are consistent, that is, consistency of the skin color of the fused face area image is improved.

As an implementation, the generator also outputs an overall image after fusing the first input image and the second input image, and a face area mask, and then a product of the fused overall image and the face area mask is used as the fused face area image. In detail, the fused face area image may be determined by formula (1).

$$I' = G_{out} \times mask \quad (1)$$

I' is the fused face area image, $G_{out}$ is the fused overall image, and mask is the face area mask.

At block 105, the fused face area image is fused with a background area image of the template image to generate a fused image.

The background area image of the template image refers to other area images in the template image other than the face area, which may include hair, a neck, other parts of a human body, and other background elements outside the human body.

It should be noted that directly fusing the first input image with the second input image may result in distortion or poor fusion quality in the fused background area image, and when performing the face fusion, it may be not required to fuse the background area image. Therefore, in the embodiment of the present disclosure, the background area image in the template image may be used as the background area image in the fused image.

As an implementation, the fused image is generated based on the fused face area image, the face area mask, and the template image. In detail, the fused image may be determined by formula (2).

$$I_{out} = I' + I_{GT} \times (1 - mask) \quad (2)$$

$I_{out}$ is the merged image, I' is the fused face area image, $I_{GT}$ is the template image, and mask is the face area mask.

At block 106, the fused image and the template image are input into a discriminator of the initial face fusion model to obtain a result, and backpropagation correction is performed on the initial face fusion model based on the result of the discriminator to generate a face fusion model.

The discriminator may be a binary classification network model. The discriminator may discriminate the input image and determine whether the input image is a real image or a synthesized fake image.

In the embodiment of this disclosure, a large number of user images and template images are used to generate the fused image, and then each template image and the corresponding fused image are input into the discriminator of the initial face fusion model, such that the discriminator may discriminate the template image and the fused image, and output a discriminating result for each input image.

As an implementation, the discriminating result output by the discriminator may be a value within a range of [0, 1]. The larger the value of the discriminating result corresponding to the image, the greater the probability that the discriminator determines that the image is the real image. The smaller the value of the discriminating result corresponding to the image, the lower the probability that the discriminator determines that the image is the real image. After the discriminator generates the discriminating results for each template image and each fused image, a value of an objective function corresponding to the face fusion model is determined according to the discriminating result for each template image and the discriminating result for each fused image, and backpropagation is performed on the value of the objective function to optimize parameters of the generator and the discriminator based on the value of the objective function, and the updated face fusion model is generate.

The updated face fusion model is used to perform a next round of training process, that is, the above blocks 101-106 are repeated. Therefore, the fused image generated by the generator may be more real, and ability of recognizing fake images for the discriminator is continuously improved. During an adversarial process of the above two, performances of the generator and the discriminator are continuously optimized until the value of the objective function corresponding to the updated face fusion model is within a preset range, which means that the performance of the updated face fusion model meets requirements, then the training process of the face fusion model is ended.

As an implementation, the objective function corresponding to the face fusion model is expressed by formula (3):

$$\mathcal{L}_{GAN}(G, D) = \min_G \max_D \mathbb{E}[\log(D_{real}) + \log(1 - D_{fake})] \quad (3)$$

$\mathcal{L}_{GAN}(G, D)$ is the objective function corresponding to the face fusion model, G is the objective function corresponding to the generator, $D_{real}$ is the value of the discriminating result corresponding to the template image, and $D_{fake}$ is the value of the discriminating result corresponding to the fused image.

As another implementation, in addition to use of the above objective function to optimize the generator, the generator may be further optimized by using a loss between the fused image and the template image. That is, when the value of the objective function is within the preset range, and the loss between the fused image and the template image is also within the preset range, the training process of the face fusion model may be completed. A loss function between the fused image and the template image is expressed by formula (4).

$$\mathcal{L}_{L2}(G) = \|I_{out} - I_{GT}\|_2 \quad (4)$$

$\mathcal{L}_{L2}(G)$ is the loss function between the fused image and the template image, $I_{out}$ is the fused image, and $I_{GT}$ is the template image.

According to the technical solution of the embodiments of the present disclosure, the reference template image is generated by performing the first face changing process on the user image and the template image, and the facial features of the template image are adjusted based on the reference template image to generate the first input image, and then the second face changing process is performed on the template image to generate the second input image. The first input image and the second input image are input into the generator of the initial face fusion model to generate the fused image. The fused image and the template image are input into the discriminator of the initial face fusion model to obtain the result, and the backpropagation correction is performed on the initial face fusion model based on the result to generate the face fusion model. Therefore, when using GAN to perform the face fusion, the template image after adjusting the facial features is input to the generator, and the template image after the face self-changing is used as the supervision data, such that the fused image includes the lighting information and the skin color information of the template image, and the consistency of the skin color of the fused image is improved.

In an implementation of this disclosure, in order to enable the generator to automatically adjust the skin color when the skin color difference is large during the process of generating the fused image, a skin color disturbance process may be performed on the image obtained after performing the face self-changing on the template image, and in the model training process, the generator may learn how to adjust the skin color for areas with the skin color difference to further improve the consistency of the skin color of the fused image.

The method for training a face fusion model according to an embodiment of the present disclosure is further described with reference to FIG. 2.

Figure 2:
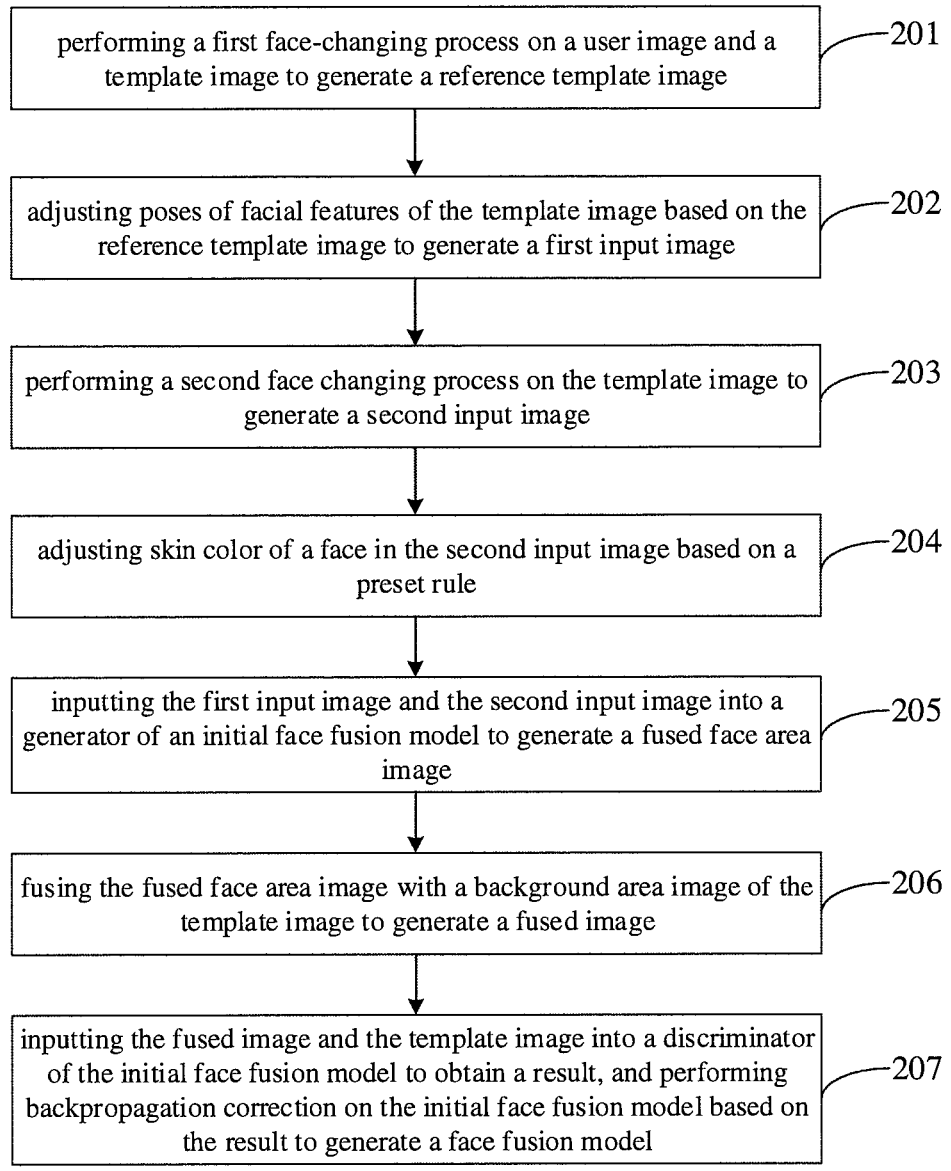
FIG. 2 is a flowchart of another method for training a face fusion model according to an embodiment of the disclosure.

FIG. 2 is a flowchart of a method for training a face fusion model according to another embodiment of the disclosure.

As illustrated in FIG. 2, the method for training the face fusion model includes the followings.

At block 201, a first face changing process is performed on a user image and a template image to generate a reference template image.

At block 202, poses of facial features of the template image are adjusted based on the reference template image to generate a first input image.

At block 203, a second face changing process is performed on the template image to generate a second input image.

For the specific implementing process and principles of the blocks 201-203, reference may be made to the detailed description of the foregoing embodiment, which will not be repeated here.

At block 204, skin color of a face in the second input image is adjusted based on a preset rule.

The preset rule may be to adjust the skin color at a boundary of the face area in the second input image, such that the skin color at the boundary of the face area is different from the skin color of the face area; or, the preset rule may also be to adjust the skin color of boundaries of the facial features of the face area in the second input image, such that the skin color of the boundaries of the facial features is different from the skin color of other areas of the face area.

It should be noted that the preset rule may include but are not limited to situations listed above. In practical applications, the preset rule is determined according to actual requirements, which is not limited in the embodiment of the present disclosure.

In the embodiment of this disclosure, since the second input image is the supervision data for training the face fusion model, statistical analysis is performed on the fused image to determine parts of the fused image that are prone to uneven skin color, and then the skin color of the face in the second input image is adjusted based on the parts that are prone to uneven skin color. When the second input image is used as the supervision data, the generator may generate a fused image with large skin color difference, and the discriminator may more easily recognize the fused image as a false image. In the process of the backpropagation correction, the generator may learn according to the discriminating results of the discriminator to obtain in the image fusion process, the skin color information of which areas of the face area being required to be concerned, and how to adjust the skin color of the concerned area in the face area, thereby, generating the fused image whose skin color is more consistent.

As an implementation, a skin color adjustment range of the second input image is determined based on the skin color of the face in the second input image to avoid distortion of the adjusted second input image. In an implementation of the embodiments of the present disclosure, before the block 204, the method further includes: determining a target skin color adjustment range based on the skin color of the face in the second input image.

Correspondingly, the block 204 may include adjusting the skin color of the face in the second input image based on the preset rule within the target skin color adjustment range.

In the embodiment, the target skin color adjustment range is determined based on the skin color of the face in the second input image, such that the target skin color adjustment range is different from the skin color of the face in the second input image. For example, when the skin color of the face in the second input image is white (that is, the pixel value corresponding to the face area is small), the target skin color adjustment range may be adjusted to a larger value, that is, when the second input image is adjusted according to the target skin color adjustment range, the skin color of the adjusted area is darker. Thus, not only the adjusted second input image may have the skin color difference, but also the distortion of the adjusted second input image may be avoided.

After determining the target skin color adjustment range, the skin color of the face in the second input image is adjusted based on the preset rule within the target skin color adjustment range.

As another implementation, an area where the skin color adjustment is performed on the second input image may be preset. That is, in an implementation of the embodiment of the present disclosure, the block 204 may include: adjusting the skin color of a preset face area in the second input image based on a preset adjustment value.

The preset adjustment value may be calibrated through statistical analysis of a large amount of experimental data, or determined in real time according to the skin color information of the face area in the second input image, which is not limited in the embodiments of the disclosure.

The preset face area may be calibrated by statistical analysis of a large amount of experimental data. For example, the preset face area may be a boundary area of the face area, a boundary area of the facial features in the face, or an internal area of the face within a certain range adjacent to the boundary area, which is not limited in the embodiments of the disclosure.

In the embodiments of the present disclosure, the preset adjustment value and the preset face area may be predetermined, and then the skin color of the preset face area in the second input image is adjusted according to the preset adjustment value.

At block 205, the first input image and the second input image are input into a generator of an initial face fusion model to generate a fused face area image.

At block 206, the fused face area image is fused with a background area image of the template image to generate a fused image.

At block 207, the fused image and the template image are input into a discriminator of the initial face fusion model to obtain a result, and backpropagation correction is performed on the initial face fusion model based on the result to generate a face fusion model.

For the specific implementing process and principles of the blocks 205-207, reference may be made to the detailed description of the above embodiments, which is not repeated here.

According to the technical solution of the embodiments of the present disclosure, the reference template image is generated by performing the first face changing process on the user image and the template image, and the poses of the facial features of the template image are adjusted based on the reference template image to generate the first input image, and then the second face changing process is performed on the template image to generate the second input image. The first input image and the second input image are input into the generator of the initial face fusion model to generate the fused image, the fused image and the template image are input into the discriminator of the initial face fusion model to obtain the result, and the backpropagation correction is performed on the initial face fusion model based on the result to generate the face fusion model. Therefore, the template image is processed by the face self-changing and the skin color adjusting, and the processed target image is used as the supervised data and input the generator. A real test scene is simulated by retaining the skin color difference, thereby, not only making the fused image including the lighting information and the skin color information of the template image, but also ensuring natural transition of the skin color in the fused image, and further improving the consistency of the skin color of the fused image.

The face fusion method using the face fusion model according to the embodiment of the present disclosure is further described below in combination with FIG. 3.

Figure 3:
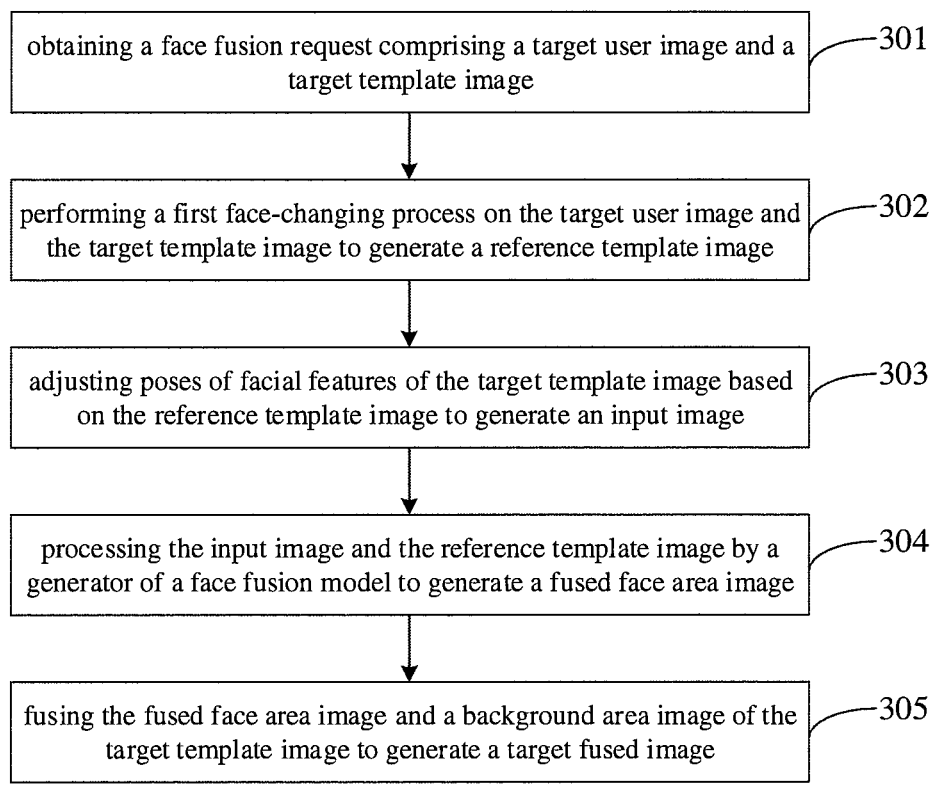
FIG. 3 is a flowchart of a face fusion method according to an embodiment of the disclosure.

FIG. 3 is a flowchart of a face fusion method according to an embodiment of the disclosure.

As illustrated in FIG. 3, the face fusion method includes the followings.

At block 301, a face fusion request including a target user image and a target template image is obtained.

It should be noted that the face fusion model according to the embodiments of the present disclosure is applied to any scene where the face fusion is performed, for example, various entertainment applications (such as game scenes) that support face special effects, movie special effects production and other scenes. After training of the face fusion model according to the embodiments of the present disclosure is completed, the face fusion model is configured in any electronic device to implement the face fusion method according to the embodiments of the present disclosure.

The face fusion request may be generated according to a user operation, or may be generated according to an instruction issued by an application associated with the face fusion model. For example, when the face fusion model of the embodiments of the present disclosure is applied to a camera application with special effects function, it is determined that the face fusion request is obtained when it is detected that the face fusion control in the camera application is triggered. When the face fusion model is applied in a certain game application, it is determined that the face fusion request is obtained when a preset game special effect is triggered.

The target user image refers to the source image including the target face. The target template image refers to the bottom plate image used for fusing with the target face in the target user image.

In the embodiments of the present disclosure, when the face fusion request is obtained, the target user image and the target template image are obtained according to the face fusion request.

At block 302, a first face changing process is performed on the target user image and the target template image to generate a reference template image.

In the embodiments of the present disclosure, the same face changing algorithm used in the training of the face fusion model may be used to perform the first face changing process on the target user image and the target template image, so as to fuse the face area in the target user image with the face area in the target template image, that is, the first face changing process is performed on the target user image and the target template image to generate the reference template image.

At block 303, poses of facial features of the target template image are adjusted based on the reference template image to generate an input image.

In the embodiments of this disclosure, since the first face changing process is performed on the target user image and the target template image, the facial features of the face area in the target user image are used to replace the facial features of the face area in the target template image, that is, the facial features of the face area in the reference template image are the facial features of the face area in the target user image. Therefore, the facial features of the face area in the reference template image is used to adjust the facial features of the target template image to generate the input image. In other words, the input image includes the background area in the target template image, the skin color information of the face area, and the facial features of the face area in the target user image.

At block 304, the input image and the reference template image are processed by a generator of a face fusion model to generate a fused face area image.

In the embodiments of the present disclosure, after the input image and the reference template image are generated, the input image and the reference template image are input to the generator of the face fusion model, such that the generator processes the input image and the reference template image to generate the fused face area image.

It should be noted that since the reference template image is generated by directly synthesizing the target user image and the target template image, the reference template image carries more target user image information. The input image is generated by adjusting the facial features of the target template image according to the reference template image. Therefore, the input image includes the facial features of the target user image, and the skin color information of the target template image, such that the fused face area image could better present the facial features of the target user image, and the skin color information of the target template image, thereby ensuring the consistency of the skin color of the fused face area image.

In a possible implementation of this disclosure, the generator outputs the overall image after fusing the input image and the reference template image, and the face area mask, and then the product of the fused overall image and the face area mask are determined as the fused face area image. In detail, the fused face area image is determined by formula (5).

$$I'_2 = G_{out2} \times mask_2 \quad (5)$$

$I'_2$ is the fused face area image, $G_{out2}$ is the fused overall image, and $mask_2$ is the face area mask.

At block 305, the fused face area image and a background area image of the target template image are fused to generate a target fused image.

The background area image in the target template image refers to other area images in the target template image except the face area, and may include hair, neck and other parts of the human body other than the face, and other background elements outside the human body.

It should be noted that directly fusing the input image with the reference template image may result in distortion or poor synthesis quality in the fused background area image, and there is no need to fuse the background area image during face fusion. Therefore, in the embodiments of the present disclosure, the background area image in the target template image may be used as the background area image in the target fused image.

As a possible implementation, the fused image is generated according to the fused face area image, the face area mask, and target template image. In detail, the target fused image is determined by formula (6).

$$I_{out2}=I'_2+I_{GT2}\times(1-mask_2) \quad (6)$$

$I_{out2}$ is the target fused image, $I'_2$ is the face area image, $I_{GT2}$ is the target template image, and $mask_2$ is the face area mask.

According to the technical solution of the embodiments of the present disclosure, a reference template image is generated by performing a first face changing process on a target user image and a target template image, and poses of facial features of the template image are adjusted based on the reference template image to generate an input image, the input image and the reference template image are processed by a generator of a face fusion model to generate a fused face area image. The fused face area image and a background area image of the target template image are fused to generate a target fused image. Therefore, when using GAN for fusing face, the target template image after adjusting the facial features is input to the generator as supervision data, such that the fused image includes illumination and skin color information of the target template image, which improves the skin color consistency of the fused image.

In a possible implementation of the present disclosure, since the face area of the target template image may contain shelters such as hair and glasses, fusion effect of the sheltered part in the face area is poor, such that the target template image is corrected by the target template image to further improve the fusion effect of the target fused image.

The face fusion method according to the embodiments of the present disclosure is further described below in combination with FIG. 4.

Figure 4:
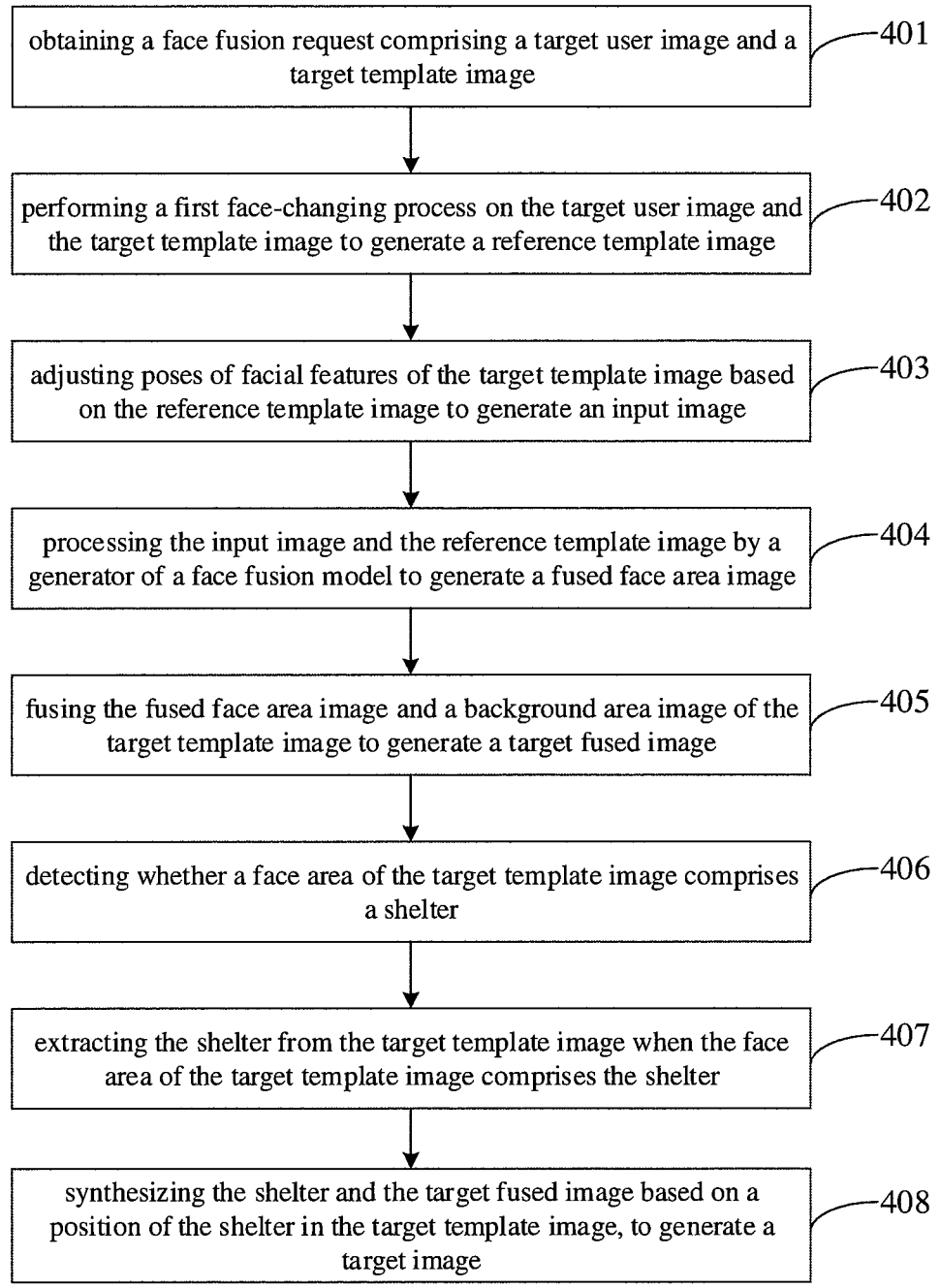
FIG. 4 is a flowchart of another face fusion method according to an embodiment of the disclosure.

FIG. 4 is a flowchart of another face fusion method according to an embodiment of the disclosure.

As illustrated in FIG. 4, the face fusion method includes the followings.

At block 401, a face fusion request including a target user image and a target template image is obtained.

At block 402, a first face changing process is performed on the target user image and the target template image to generate a reference template image.

At block 403, poses of facial features of the target template image are adjusted based on the reference template image to generate an input image.

At block 404, the input image and the reference template image are processed by a generator of a face fusion model to generate a fused face area image.

At block 405, the fused face area image and a background area image of the target template image are fused to generate a target fused image.

For the specific implementation process and principles of steps 401-405, reference may be made to the detailed description of the embodiments, which is not repeated here.

At block 406, it is detected whether a face area of the target template image includes a shelter.

The shelters may include hair, glasses, masks and hats, which are not limited in the embodiments of the present disclosure.

In the embodiment of this disclosure, since the color of the shelter is usually quite different from the skin color of the face area, it is possible to detect whether the face area in the target template image includes the shelter according to the difference in pixel values of each part of the face area, and location and range of the shelter.

It should be noted that in actual use, a suitable shelter detection algorithm is selected according to actual needs, which is not limited in the embodiment of the present disclosure.

At block 407, the shelter is extracted from the target template image when the face area of the target template image includes the shelter.

In the embodiment of the present disclosure, if it is detected that the face area of the target template image includes the shelter, a segmentation network model may be used to extract the shelter from the target template image, that is, to determine the shelter mask corresponding to the target template image.

At block 408, the shelter and the target fused image are synthesized based on a position of the shelter in the target template image, to generate a target image.

As a possible implementation, the position of the shelter in the target template image is expressed by the shelter mask corresponding to the target template image. Therefore, after extracting the shelter in the target template image, the shelter and the target fused image are synthesized according to the target fused image, the target template image, and the shelter mask corresponding to the target template image are synthesized to generate the target image. In detail, the target image is determined by formula (7).

$$I=I_{GT2}\times end\_mask+I_{out2}\times(1-end\_mask) \quad (7)$$

I is the target image, $I_{GT2}$ is the target template image, end_mask is the shelter mask corresponding to the target template image, and $I_{out2}$ is the target fused image.

According to the technical solution of the embodiments of the present disclosure, after the target fused image is generated, it is detected whether the face area in the target template image includes a shelter, and when the face area in the target template image includes the shelter, the shelter is extracted from the target template image. The shelter and the target fused image are synthesized to generate a target image based on a position of the shelter in the target template image. Therefore, the target fused image is used for post-de-occlusion process, and the target fused image is corrected by the shelter area of the target template image, such that the fused image not only includes the illumination and skin color information of the target template image, but also improves skin color consistency of the fused image, and the fusion effect of the fused image is further improved.

In order to implement the above embodiments, this disclosure also provides an apparatus for training a face fusion model.

Figure 5:
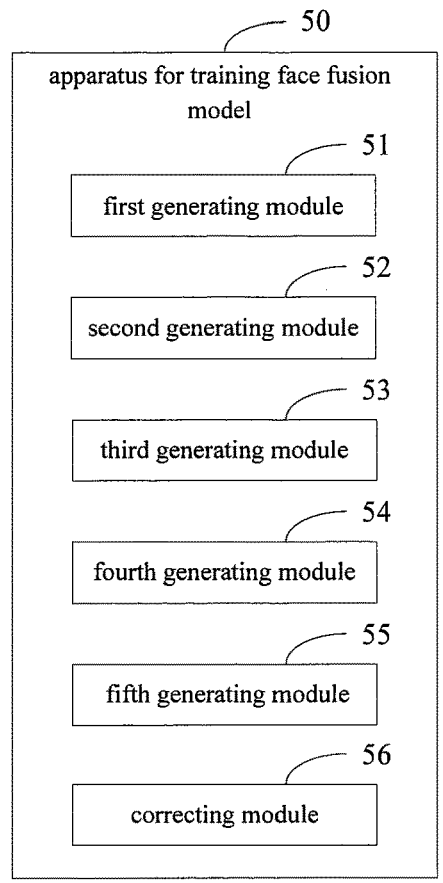
FIG. 5 is a schematic diagram of an apparatus for training a face fusion model according to an embodiment of the disclosure.

FIG. 5 is a schematic diagram of an apparatus for training a face fusion model according to an embodiment of the disclosure.

As illustrated in FIG. 5, the apparatus 50 for training the face fusion model includes: a first generating module 51, a second generating module 52, a third generating module 53, a fourth generating module 54, a fifth generating module 55 and a correcting module 56. The first generating module 51 is configured to perform a first face changing process on a user image and a template image to generate a reference template image. The second generating module 52 is configured to adjust poses of facial features of the template image based on the reference template image to generate a first input image. The third generating module 53 is configured to perform a second face changing process on the template image to generate a second input image. The fourth generating module 54 is configured to input the first input image and the second input image into a generator of an initial face fusion model to generate a fused face area image. The fifth generating module 55 is configured to fuse the fused face area image with a background area image of the template image to generate a fused image. The correcting module 56 is configured to input the fused image and the template image into a discriminator of the initial face fusion model to obtain a result, and perform backpropagation correction on the initial face fusion model based on the result to generate a face fusion model.

In practical applications, the apparatus for training the face fusion model according to the embodiment of the present disclosure is configured in any electronic device to implement the face method for training the face fusion model.

According to the technical solution of the embodiments of the present disclosure, the reference template image is generated by performing the first face changing process on the user image and the template image, and the facial features of the template image are adjusted based on the reference template image to generate the first input image, and then the second face changing process is performed on the template image to generate the second input image. The first input image and the second input image are input into the generator of the initial face fusion model to generate the fused image. The fused image and the template image are input into the discriminator of the initial face fusion model to obtain the result, and backpropagation correction is performed on the initial face fusion model based on the result to generate the face fusion model. Therefore, when using GAN for face fusion, the template image after adjusting the facial features is input to the generator, and the template image after the face change is used as the supervision data, such that the fused image includes the illumination and skin color information of the template image, which improves the skin color consistency of the fused image.

In a possible implementation of the present disclosure, the apparatus 50 for training the face fusion model further includes: an adjusting module, configured to adjust skin color of a face in the second input image based on a preset rule.

In a possible implementation of the present disclosure, the apparatus 50 for training the face fusion model further includes: a determining module, configured to determine a target skin color adjustment range based on the skin color of the face in the second input image.

Correspondingly, the adjusting module includes: a first adjusting unit, configured to adjust the skin color of the face in the second input image based on the preset rule within the target skin color adjustment range.

In a possible implementation of the present disclosure, the adjusting module further includes: a second adjusting unit, configured to adjust the skin color of a preset face area in the second input image based on a preset adjustment value.

It should be noted that the description of the embodiment of the method for training the face fusion model shown in FIGS. 1 and 2 is also applicable to the apparatus 50 for training the face fusion model of this embodiment, which is not repeated here.

According to the technical solution of the embodiments of the present disclosure, a reference template image is generated by performing a first face changing process on a user image and a template image, and poses of facial features of the template image are adjusted based on the reference template image to generate a first input image, and then a second face changing process is performed on the template image to generate a second input image. The skin color of the face in the second input image is adjusted according to preset rules. The first input image and the second input image are input into a generator of an initial face fusion model to generate a fused face area image. The fused image and the template image are input into a discriminator of the initial face fusion model to obtain a result, and backpropagation correction is performed on the initial face fusion model based on the result to generate a face fusion model. Therefore, by performing face changing process and skin color adjustment process on the template image, and inputting the target image processed after the face changing process and the skin color adjustment process as the supervisory data into the generator, a real test scene is simulated by preserving difference in skin color, such that not only the fused image includes the illumination and skin color information of the template image are improved, and natural transition of the skin color information in the fused image is ensured, which further improves the skin color consistency of the fused image.

In order to implement the above embodiments, the present disclosure also provides a face fusion apparatus.

Figure 6:
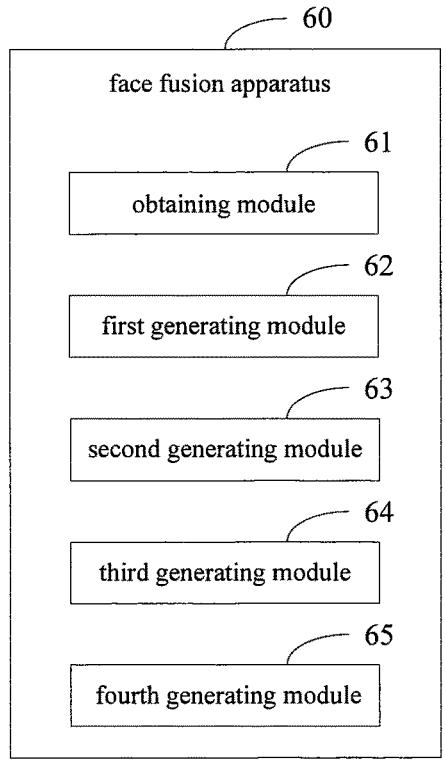
FIG. 6 is a schematic diagram of a face fusion apparatus according to an embodiment of the disclosure.

FIG. 6 is a schematic diagram of a face fusion apparatus according to an embodiment of the disclosure.

As illustrated in FIG. 6, the face fusion apparatus 60 includes: an obtaining module 61, a first generating module 62, a second generating module 63, a third generating module 64 and a fourth generating module 65.

The obtaining module 61 is configured to obtain a face fusion request comprising a target user image and a target template image. The first generating module 62 is configured to perform a first face changing process on the target user image and the target template image to generate a reference template image. The second generating module 63 is configured to adjust poses of facial features of the target template image based on the reference template image to generate an input image. The third generating module 64 is configured to process the input image and the reference template image by a generator of a face fusion model to generate a fused face area image. The fourth generating module 65 is configured to fuse the fused face area image and a background area image of the target template image to generate a target fused image.

In actual applications, the face fusion apparatus according to the embodiments of the present disclosure is configured in any electronic device to implement the face fusion method.

According to the technical solution of the embodiments of the present disclosure, the target user image and the target template image in the face fusion request are subjected to the face changing process to generate the reference template image after the face change, and poses of facial features of the target template image are adjusted based on the reference template image to generate the input image, and then the generator of the face fusion model processes the input image and the reference template image to generate the fused face area image, and then the fused face area image is fused with the background area of the target template image to generate the target fusion image. Therefore, when using GAN for face fusion, the target template image after adjusting the facial features is input to the generator as the supervision data, such that the fused image includes the illumination and skin color information of the target template image, and the skin color consistency of the fused image is improved.

In a possible implementation of the present disclosure, the face fusion apparatus 60 further includes: a detecting module, an extracting module and a fifth generating module.

The detecting module is configured to detect whether a face area of the target template image includes a shelter.

The extracting module is configured to extract the shelter from the target template image when the face area of the target template image comprises the shelter.

The fifth generating module is configured to synthesize the shelter and the target fused image based on a position of the shelter in the target template image, to generate a target image.

It should be noted that the description of the face fusion method shown in FIGS. 3 and 4 is also applicable to the face fusion apparatus 60 of this embodiment, which is not repeated here.

According to the technical solution of the embodiments of the present disclosure, after the target fused image is generated, it is detected whether a face area of the target template image includes a shelter. The shelter is extracted from the target template image when the face area of the target template image includes the shelter. The shelter and the target fused image are synthesized based on a position of the shelter in the target template image, to generate a target image. Therefore, the target fused image is used for post-deocclusion process, and the target fused image is corrected based on the shelter area of the target template image, such that the fused image not only includes the illumination and skin color information of the target template image, but also improves the consistency of the skin color of the fused image, and further improve the fusion effect of the fused image.

According to the embodiments of the present disclosure, the disclosure also provides an electronic device and a readable storage medium.

Figure 7:
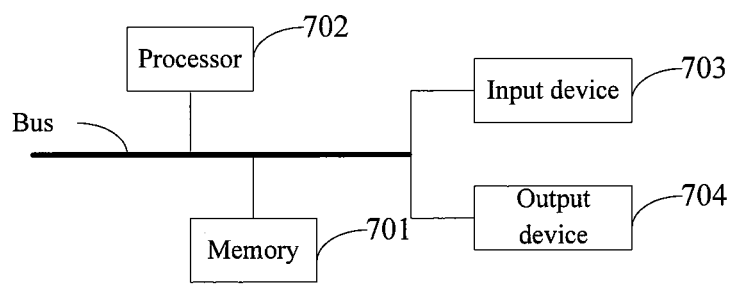
FIG. 7 is a schematic diagram of an electronic device according to an embodiment of the disclosure.

FIG. 7 is a block diagram of an electronic device used to implement the method for training the face fusion model or the face fusion method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the disclosure. The memory stores instructions executable by at least one processor, such that the at least one processor executes the method for training the face fusion model or the face fusion method according to the disclosure. The non-transitory computer-readable storage medium of the disclosure stores computer instructions, which are used to cause a computer to execute the method for training the face fusion model or the face fusion method according to the disclosure.

As a non-transitory computer-readable storage medium, the memory 702 is configured to store non-transitory software programs, non-transitory computer executable programs and modules, such as program instructions/modules (for example, the first generating module 51, the second generating module 52, the third generating module 53, the fourth generating module 54, the fifth generating module 55, and the correcting module 56 shown in FIG. 5) corresponding to the method for training the face fusion model in the embodiment of the present disclosure, and program instructions/modules (for example, the obtaining module 61, the first generating module 62, the second generating module 63, the third generating module 64, and the fourth generating module 65 shown in FIG. 6) corresponding to the face fusion method in the embodiment of the present disclosure. The processor 701 executes various functional applications and data processing of the server by running non-transitory software programs, instructions, and modules stored in the memory 702, that is, implementing the method for training the face fusion model or the face fusion method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method for training the face fusion model and the face fusion method may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the technical solution of the embodiments of the present disclosure, a reference template image is generated by performing a first face changing process on a user image and a template image, and poses of facial features of the template image are adjusted based on the reference template image to generate a first input image, and then a second face changing process is performed on the template image to generate a second input image. The first input image and the second input image are input into a generator of an initial face fusion model to generate a fused image, the fused image and the template image are input into a discriminator of the initial face fusion model to obtain a result, and backpropagation correction is performed on the initial face fusion model based on the result to generate a face fusion model. Therefore, when using GAN for face fusion, the template image after adjusting the facial features is input to the generator, and the template image after the first face changing process is used as supervision data, such that the fused image includes illumination and skin color information of the template image, which improves the skin color consistency of the fused image.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for training a face fusion model, comprising:
generating a reference template image by replacing facial features of a face area in a template image with facial features of a face area in a user image through a face changing algorithm;
adjusting poses of facial features of the face area in the template image based on the reference template image to generate a first input image;
generating a second input image by taking the template image as two inputs of the face changing algorithm, replacing the facial features of the face area in the template image through the face changing algorithm according to the facial features of the face area in the template image, wherein skin color information in the second input image and skin color information in the template image are consistent;

inputting the first input image and the second input image into a generator of an initial face fusion model to generate a fused face area image;

fusing the fused face area image with a background area image of the template image to generate a fused image; and inputting the fused image and the template image into a discriminator of the initial face fusion model to obtain a result, and performing backpropagation correction on the initial face fusion model based on the result to generate a face fusion model.

2. The method according to claim 1, before processing the first input image and the second input image by the generator of the initial face fusion model, the method further comprising:

adjusting skin color of a face in the second input image based on a preset rule.

3. The method according to claim 2, before adjusting the skin color of the face in the second input image based on the preset rule, the method further comprising:

determining a target skin color adjustment range based on the skin color of the face in the second input image;

wherein adjusting the skin color of the face in the second input image based on the preset rule comprises:

adjusting the skin color of the face in the second input image based on the preset rule within the target skin color adjustment range.

4. The method according to claim 2, wherein adjusting the skin color of the face in the second input image based on the preset rule comprising:

adjusting the skin color of a preset face area in the second input image based on a preset adjustment value.

5. The method according to claim 3, wherein adjusting the skin color of the face in the second input image based on the preset rule comprising:

adjusting the skin color of a preset face area in the second input image based on a preset adjustment value.

6. A face fusion method, using a face fusion model generated according to claim 1, comprising:

obtaining a face fusion request comprising a target user image and a target template image;

performing a first face changing process on the target user image and the target template image to generate a reference template image;

adjusting poses of facial features of the target template image based on the reference template image to generate an input image;

processing the input image and the reference template image by a generator of a face fusion model to generate a fused face area image; and fusing the fused face area image and a background area image of the target template image to generate a target fused image.

7. The method according to claim 6, after generating the target fused image, the method further comprising:

detecting whether a face area of the target template image comprises a shelter;

extracting the shelter from the target template image when the face area of the target template image comprises the shelter; and synthesizing the shelter and the target fused image based on a position of the shelter in the target template image, to generate a target image.

8. An electronic device, comprising:

at least one processor; and a memory communicatively connected with the at least one processor; wherein, the memory stores instructions executable by the at least one processor, and when the instructions are executed by the at least one processor, the at least one processor is configured to:

generate a reference template image by replacing facial features of a face area in a template image with facial features of a face area in a user image through a face changing algorithm;

adjust poses of facial features of the face area in the template image based on the reference template image to generate a first input image;

generate a second input image by taking the template image as two inputs of the face changing algorithm, replacing the facial features of the face area in the template image through the face changing algorithm according to the facial features of the face area in the template image, wherein skin color information in the second input image and skin color information in the template image are consistent;

input the first input image and the second input image into a generator of an initial face fusion model to generate a fused face area image;

fuse the fused face area image with a background area image of the template image to generate a fused image; and input the fused image and the template image into a discriminator of the initial face fusion model to obtain a result, and perform backpropagation correction on the initial face fusion model based on the result to generate a face fusion model.

9. The electronic device according to claim 8, wherein, the at least one processor is further configured to:

before processing the first input image and the second input image by the generator of the initial face fusion model, adjust skin color of a face in the second input image based on a preset rule.

10. The electronic device according to claim 9, wherein, the at least one processor is further configured to:

before adjusting the skin color of the face in the second input image based on the preset rule, determine a target skin color adjustment range based on the skin color of the face in the second input image;

wherein, the at least one processor is further configured to:

adjust the skin color of the face in the second input image based on the preset rule within the target skin color adjustment range.

11. The electronic device according to claim 9, wherein, the at least one processor is further configured to:

adjust the skin color of a preset face area in the second input image based on a preset adjustment value.

12. The electronic device according to claim 10, wherein, the at least one processor is further configured to:

adjust the skin color of a preset face area in the second input image based on a preset adjustment value.

13. An electronic device, using a face fusion model generated according to claim 8, comprising:

at least one processor; and a memory communicatively connected with the at least one processor; wherein, the memory stores instructions executable by the at least one processor, and when the instructions are executed by the at least one processor, the at least one processor is configured to:

obtain a face fusion request comprising a target user image and a target template image;

perform a first face changing process on the target user image and the target template image to generate a reference template image;

adjust poses of facial features of the target template image based on the reference template image to generate an input image;

process the input image and the reference template image by a generator of a face fusion model to generate a fused face area image; and fuse the fused face area image and a background area image of the target template image to generate a target fused image.

14. The electronic device according to claim 13, wherein, the at least one processor is further configured to:

after generating the target fused image, detect whether a face area of the target template image comprises a shelter; extract the shelter from the target template image when the face area of the target template image comprises the shelter; and synthesize the shelter and the target fused image based on a position of the shelter in the target template image, to generate a target image.

15. A non-transitory computer-readable storage medium storing computer instructions, wherein the computer instructions are used to cause the computer to implement a method for training a face fusion model, and the method comprises:

generating a reference template image by replacing facial features of a face area in a template image with facial features of a face area in a user image through a face changing algorithm;

adjusting poses of facial features of the face area in the template image based on the reference template image to generate a first input image;

generating a second input image by taking the template image as two inputs of the face changing algorithm, replacing the facial features of the face area in the template image through the face changing algorithm according to the facial features of the face area in the template image, wherein skin color information in the second input image and skin color information in the template image are consistent;

inputting the first input image and the second input image into a generator of an initial face fusion model to generate a fused face area image;

fusing the fused face area image with a background area image of the template image to generate a fused image; and inputting the fused image and the template image into a discriminator of the initial face fusion model to obtain a result, and performing backpropagation correction on the initial face fusion model based on the result to generate a face fusion model.

16. The storage medium according to claim 15, before processing the first input image and the second input image by the generator of the initial face fusion model, the method further comprising:

adjusting skin color of a face in the second input age based on a preset rule.

17. The storage medium according to claim 16, before adjusting the skin color of the face in the second input image based on the preset rule, the method further comprising:

determining a target skin color adjustment range based on the skin color of the face in the second input image;

wherein adjusting the skin color of the face in the second input image based on the preset rule comprises:

adjusting the skin color of the face in the second input image based on the preset rule within the target skin color adjustment range.

18. The storage medium according to claim 16, wherein adjusting the skin color of the face in the second input image based on the preset rule comprising:

adjusting the skin color of a preset face area in the second input image based on a preset adjustment value.

19. A non-transitory computer-readable storage medium storing computer instructions, wherein the computer instructions are used to cause the computer to implement a face fusion method, using a face fusion model generated according to claim 15, and the method comprises:

obtaining a face fusion request comprising a target user image and a target template image;

performing a first face changing process on the target user image and the target template image to generate a reference template image;

adjusting poses of facial features of the target template image based on the reference template image to generate an input image;

processing the input image and the reference template image by a generator of a face fusion model to generate a fused face area image; and fusing the fused face area image and a background area image of the target template image to generate a target fused image.

20. The storage medium according to claim 19, after generating the target fused image, the method further comprising:

detecting whether a face area of the target template image comprises a shelter;

extracting the shelter from the target template image when the face area of the target template image comprises the shelter; and synthesizing the shelter and the target fused image based on a position of the shelter in the target template image, to generate a target image.

* * * * *